No. 824,754. PATENTED JULY 3, 1906.
C. A. STURTEVANT.
FOLDING MACHINE.
APPLICATION FILED JAN. 23, 1905.

Witnesses:
Chas. A. Sturtevant
Inventor
by Geyer & Popp
Attorneys.

No. 824,754. PATENTED JULY 3, 1906.
C. A. STURTEVANT.
FOLDING MACHINE.
APPLICATION FILED JAN. 23, 1905.

No. 824,754. PATENTED JULY 3, 1906.
C. A. STURTEVANT.
FOLDING MACHINE.
APPLICATION FILED JAN. 23, 1905.

No. 824,754. PATENTED JULY 3, 1906.
C. A. STURTEVANT.
FOLDING MACHINE.
APPLICATION FILED JAN. 23, 1905.

Witnesses:

Chas. A. Sturtevant, Inventor
by Geyer & Popp
Attorneys.

UNITED STATES PATENT OFFICE.

CHARLES A. STURTEVANT, OF PLAINFIELD, NEW JERSEY, ASSIGNOR TO E. C. FULLER COMPANY, OF NEW YORK, N. Y., A CORPORATION OF NEW YORK.

FOLDING-MACHINE.

No. 824,754.     Specification of Letters Patent.     Patented July 3, 1906.

Application filed January 23, 1905. Serial No. 242,273.

*To all whom it may concern:*

Be it known that I, CHARLES A. STURTE-VANT, a citizen of the United States, residing at Plainfield, in the county of Union and State of New Jersey, have invented new and useful Improvements in Folding-Machines, of which the following is a specification.

This invention relates more particularly to a folding-machine capable of folding a sheet of paper or the like into a signature having one or more parallel or right-angle folds; but some of the features are also applicable to other types of folding-machines.

One of the objects of this invention is to so connect or mount the folding-blades on their supporting or actuating means that the same will automatically adjust themselves to the sheets and folding-rollers with which they coöperate, thus avoiding the necessity of accurately adjusting these parts relatively to each other and also permitting the folding-rollers to run closer together for producing a sharper crease in the paper than has been possible heretofore.

Another object of this invention is to provide simple and convenient means whereby the sheets may be directed either toward the devices which fold the same into periodical form or toward those devices which fold the same into book form and, if desired, to perforate the signature while in transit to either of these devices.

Another object of my invention is to provide reliable and efficient means for causing the signature to be discharged directly from one of the pairs of folding-rollers into a stacker-box or for causing the same to be delivered from said rollers to devices which produce another fold in the same.

This invention has the further object to improve the machine in several details of construction.

In the accompanying drawings, consisting of seven sheets.

Similar letters of reference indicate corresponding parts throughout the several views.

Figures 9, 10, 11:
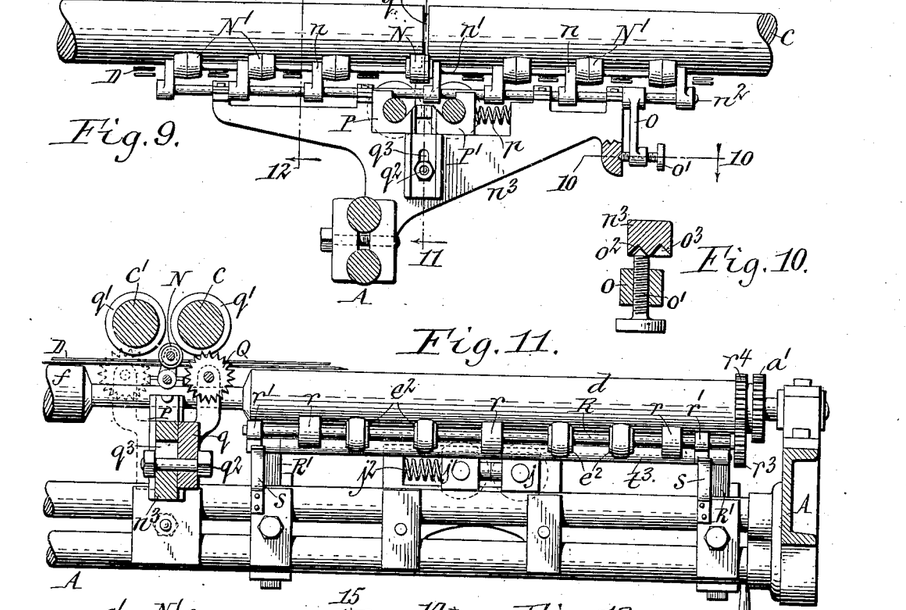
Fig. 9 is a fragmentary transverse section, on an enlarged scale, taken in line 9 9, Fig. 3, and showing the switch mechanism for directing the sheets either toward the book or periodical folding devices.
Fig. 10 is a fragmentary horizontal section in line 10 10, Fig. 9.
Figs. 11 and 12 are fragmentary vertical sections in lines 11 11 and 12 12, Fig. 9.
Figures 12, 13, 14, 15, 16:
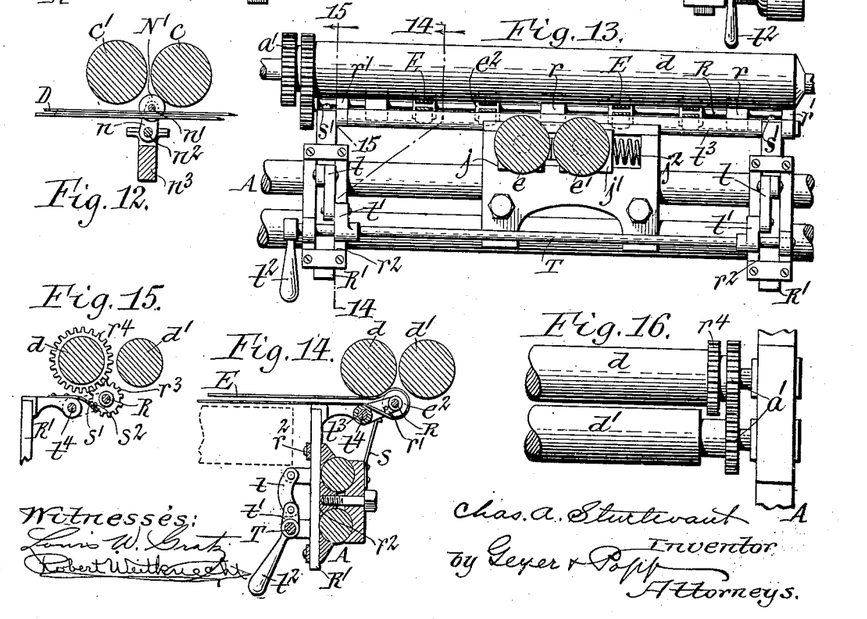
Fig. 13 is a fragmentary vertical section, on an enlarged scale, taken in line 13 13, Fig. 4.
Figs. 14 and 15 are vertical transverse sections taken in lines 14 14 and 15 15, Fig. 13.
Fig. 16 is a fragmentary top plan view of the third pair of book folding-rollers and adjacent parts.

In its general organization this folding-machine consists of a main frame A; a feed board or table $a$, arranged at the front end of the frame and adapted to support the pile of sheets to be folded into signatures; a first pair of folding-rollers $b\ b'$, arranged in the upper part of the frame in rear of the table and adapted to produce the first fold in the sheet; a second pair of folding-rollers $c\ c'$, arranged at right angles to the first pair and receiving the sheet therefrom; a third pair of folding-rollers $d\ d'$, arranged parallel to the first pair and receiving the sheet from the second pair; a fourth pair of book folding-rollers $e\ e'$, arranged parallel to the second pair and receiving the sheet from the third pair of book-rollers; a third pair of periodical folding-rollers $f\ f'$, arranged parallel to the first pair and receiving the sheets from the second pair; a fourth pair of periodical folding-rollers $g\ g'$, arranged parallel to the third pair of periodical-rollers $f f'$ and receiving the sheets therefrom, and a fourth pair of periodical folding-rollers $h h'$, arranged parallel to the second pair. These several pairs of rollers are all arranged horizontally, the first pair being arranged lengthwise in the upper part of the frame, the second pair in front of the first, the third pair of book-rollers $d d'$ and the third pair of periodical-rollers $f f'$ being arranged parallel to the first and on opposite sides of the second pair, the fourth periodical-rollers $g g'$ being in rear of the third pair $f f'$ and the fourth periodical-rollers $h h'$ being to the left of the third periodical-rollers $f f'$. Each pair of these rollers may be connected by the usual intermeshing gears $a'$, as shown in the drawings, for causing them to turn together, and the several pairs may be driven in any suitable manner, but preferably as follows: I represents the driving-shaft journaled transversely in the frame and provided at its outer end with a cone-driving pulley, a main longitudinal shaft $i$ connected by bevel-gears $i'$ with the driving-shaft, a gear-wheel $i^2$ on the main shaft meshing with the gear-wheel of the first roller $b$, a pair of bevel gear-wheels $i^3$ connecting the main shaft with the roller $c$ of the second pair, a longitudinal cam-shaft $I'$, having a gear-wheel $i^4$, meshing with a pinion $i^5$ at the front end of the main shaft, a longitudinal counter-shaft $i^6$ connected with the roller $g$ of the fourth periodical pair and having a pinion $i^7$ meshing with the gear-wheel $i^4$, an inclined shaft $i^8$ connected at one end by intermeshing bevel gear-wheels $i^9$ with the counter-shaft and at its opposite end by similar wheels $i^{10}$ with the rollers $d f$ of the third book and periodical pairs parallel to the first, intermeshing spiral gear-wheels $i^{11}$ secured, respectively, to the rear end of the main shaft and the shaft of the roller $h$ of the fourth periodical pair, and a short vertical shaft connected at its upper end by a pair of intermeshing bevel gear-wheels $i^{12}$ with the main shaft and at its lower end by a similar pair of wheels $i^{13}$ with the roller $e$ of the fourth book pair, as shown in Figs. 1, 3 to 6, and 16. One of the rollers of each pair is journaled in bearings $j$, which are fixed on the main frame, while the companion roller is journaled in bearings $j'$, which are movable toward and from the fixed bearings and are yieldingly pressed toward the same by means of springs $j^2$, as is commonly done in folding-machines of this class. Bearings of this character are illustrated in Figs. 11 and 13.

Figure 3:
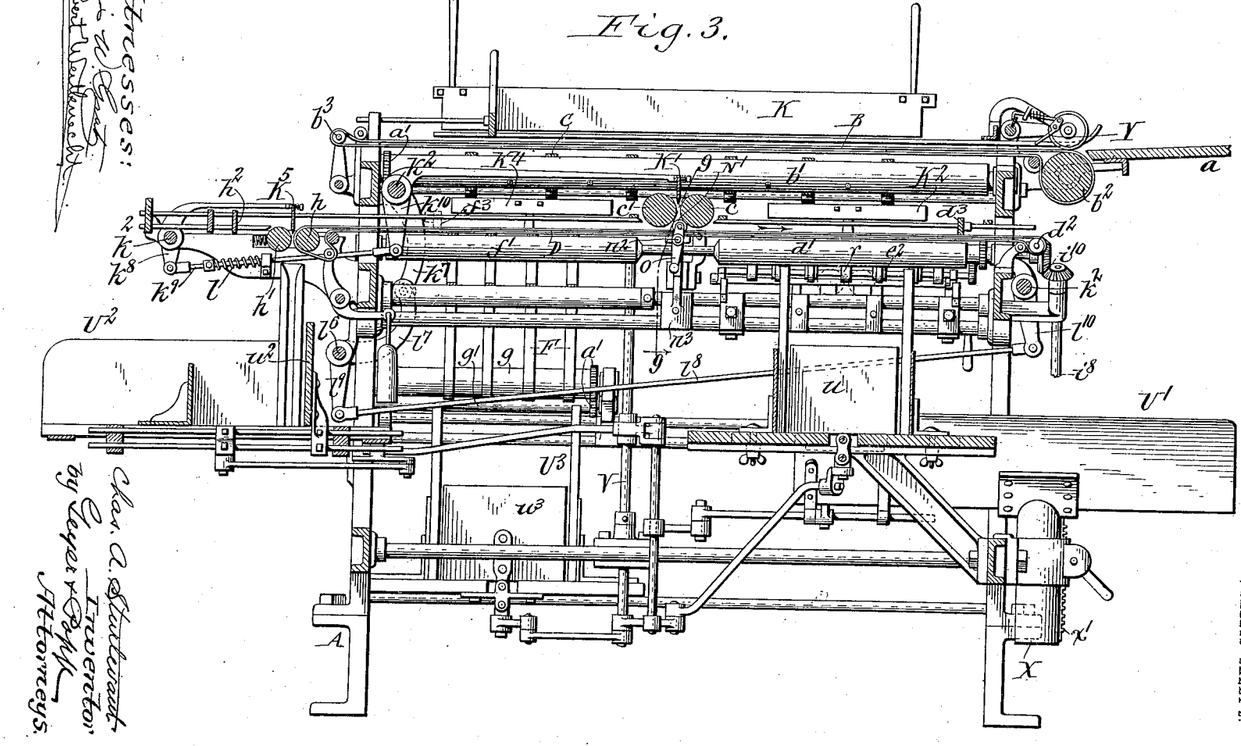
Fig. 3 is a vertical longitudinal section, on an enlarged scale, taken in line 3 3, Fig. 1.
Figure 4:
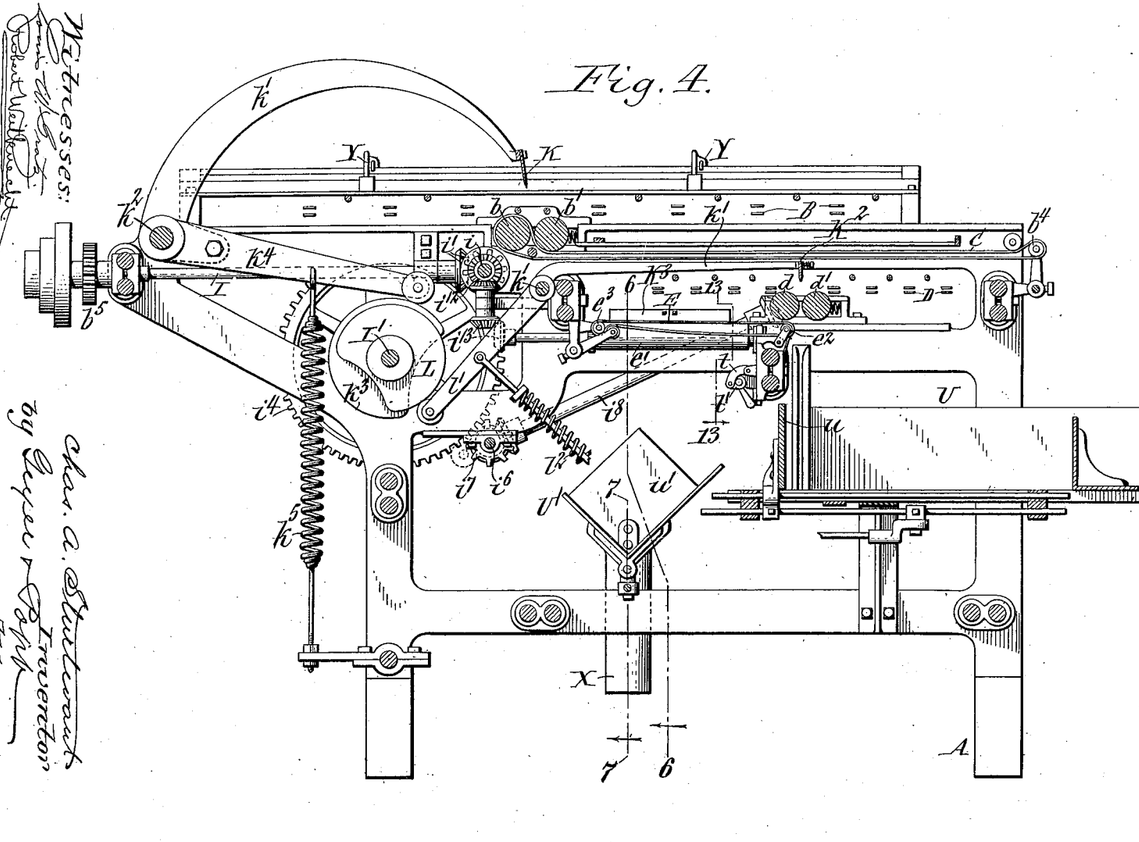
Figs. 4 and 5 are vertical transverse sections taken on the correspondingly-numbered lines in Fig. 1.
Figure 5:
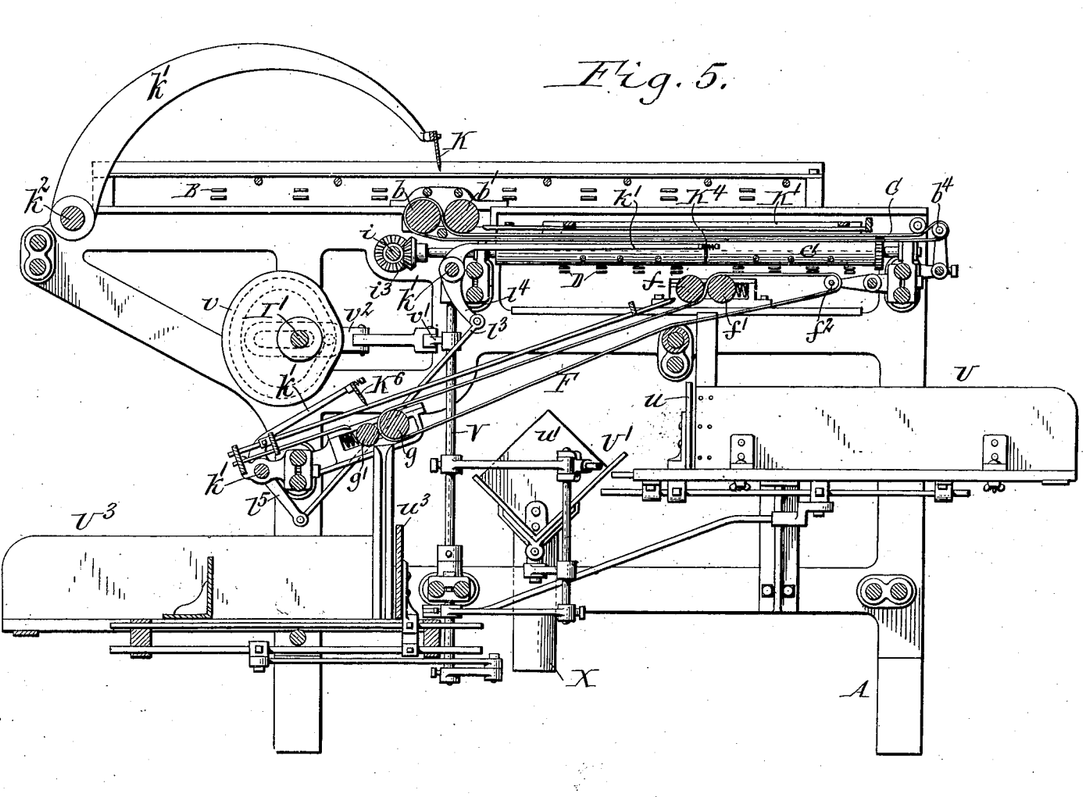

The sheet-propelling mechanism comprises a set of tapes B, which carry the sheets from the feed-board to the first rollers; a set of tapes C, which carry the sheets from the first to the second rollers; a single set of tapes D, which carry the sheets from the second rollers either to the fourth periodical-rollers $h h'$ or to the third book-rollers $d d'$ or the third periodical-rollers $f f'$, a set of tapes E, which carry the sheets from the third book-rollers $d d'$ to the fourth book-rollers $e e'$, and a set of tapes F, which carry the sheets from the third periodical-rollers $f f'$ to the fourth periodical-rollers $g g'$. The first tapes B pass at their receiving and delivery ends around receiving and delivery rollers $b^2 b^3$. The second tapes C pass at their receiving and delivery ends around the roller $b$ of the first pair and around tightener-rollers $b^4$. The third tapes D pass transversely underneath the second rollers and lengthwise of both pairs of third rollers which are parallel to the first and at one end around the roller $h$ of the fourth pair parallel to the second, while their opposite ends pass around guide-rollers $d^2$ on the main frame. The book-tapes E pass at their front and rear ends around receiving and delivery rollers $e^2 e^3$, and the periodical-tapes F pass at one end around the roller $g$ and at the opposite end around a roller $f^2$, while the intermediate portions of the same pass over the roller $f'$ and underneath the roller $f$, as shown in Figs. 3, 4, and 5. The first set of tapes B is driven from the driving-shaft by a train of gears $b^5$, connecting the same with the shaft of the receiving-roller $b^2$, while the remaining sets of tapes are driven by the folding-rollers around which they pass.

Figures 1, 2:
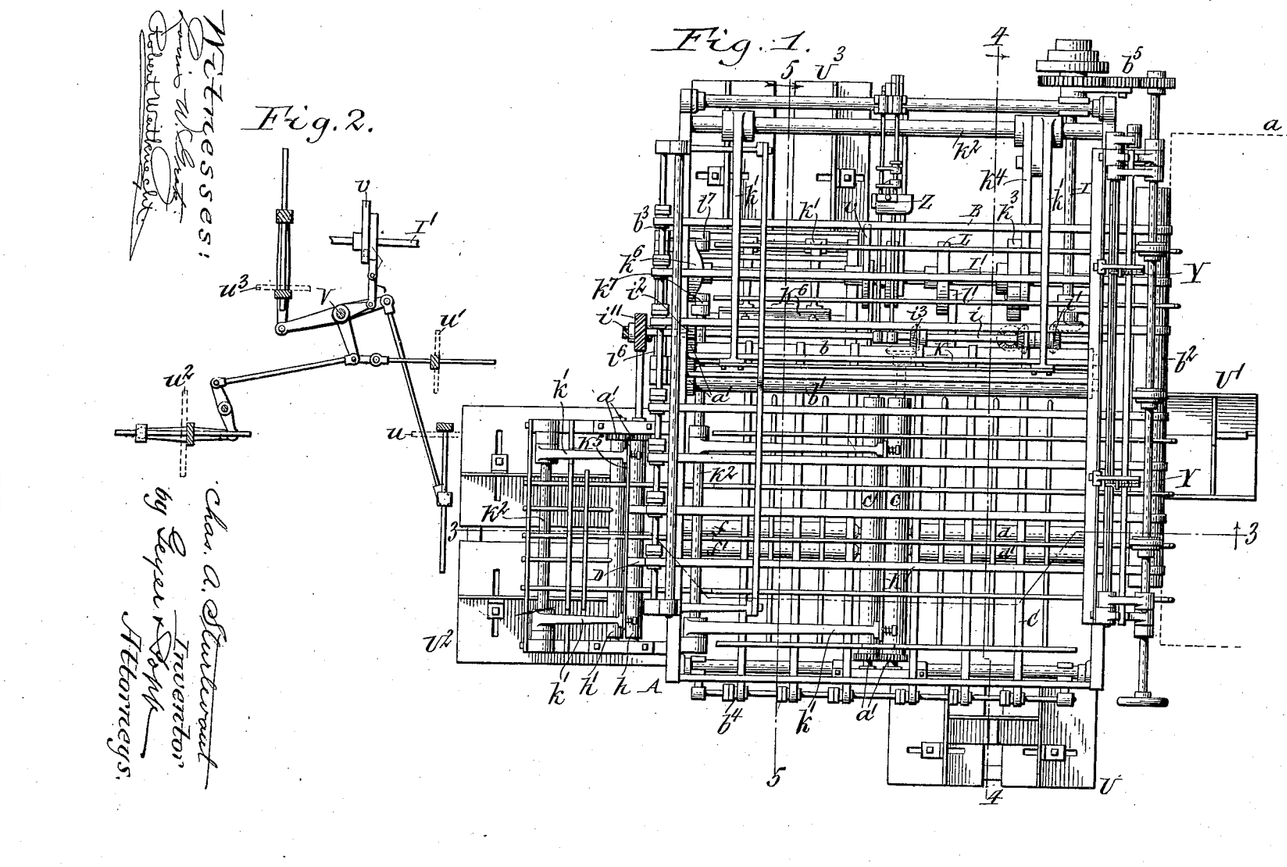
Figure 1 is a top plan view of a sheet-folding machine embodying my improvements.
Fig. 2 is a diagrammatic horizontal sectional view of the mechanism for operating a plurality of packers.
Figures 6, 7, 8:
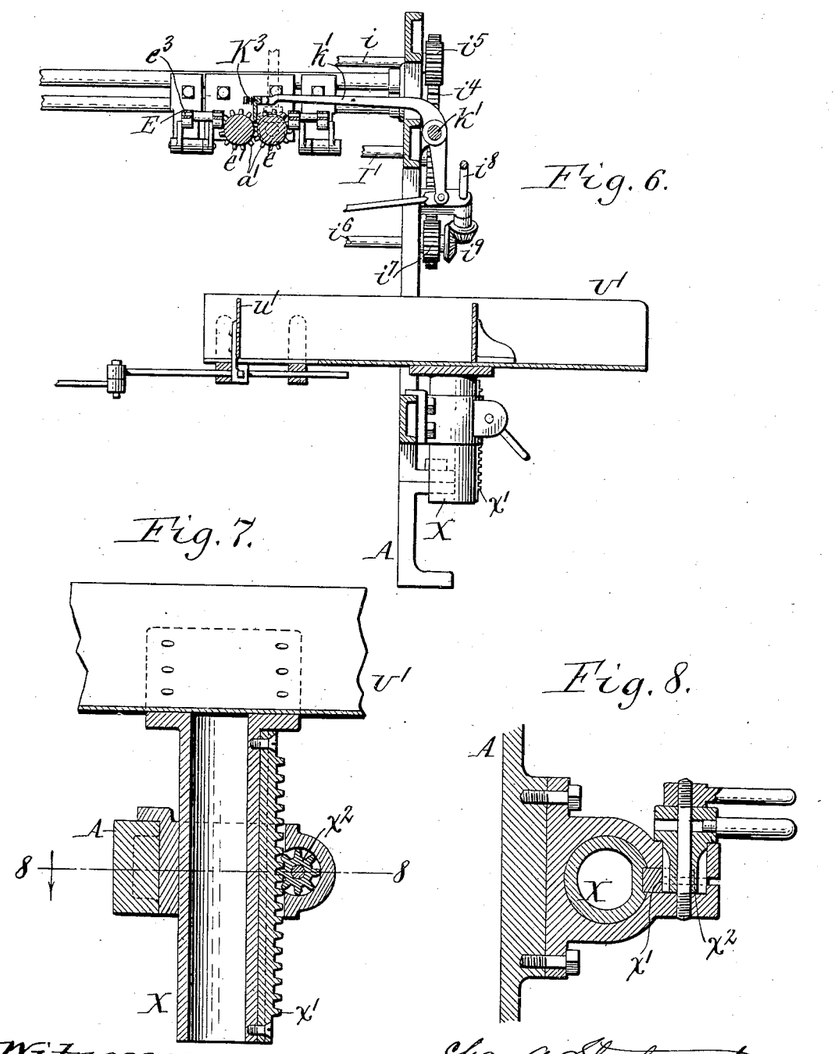
Fig. 6 is a fragmentary vertical longitudinal section of one of the folding and stacking devices, taken in line 6 6, Fig. 4.
Fig. 7 is a fragmentary vertical section, on an enlarged scale, in line 7 7, Fig. 4, showing the box-elevating mechanism of the last-mentioned stacking device.
Fig. 8 is a horizontal section in line 8 8, Fig. 7.

K to $K^6$ are the several folding-blades which coöperate with the folding-rollers of the first pair, second pair, third book pair, fourth book pair, third periodical pair parallel to the first, fourth periodical pair parallel to the second, and the fourth periodical pair parallel to the first, respectively, each blade being arranged above its respective pair of rollers and movable vertically toward and from the space between the same. Each of these folding-blades is mounted on the free ends of one or more rock-arms $k'$, which are secured to a horizontal rock-shaft $k^2$, which is journaled in bearings on the frame. The shaft of the first folding-blade is rocked by means of a cam $k^3$, arranged on the cam-shaft and operating to turn an arm $k^4$, which is secured to said rock-shaft in the direction for raising the first blade K, this arm being moved in the opposite direction by means of a spring $k^5$. The rock-shaft of the second blade $K'$ is turned in the direction for raising this blade by means of a cam $k^6$, arranged on the cam-shaft and operating against a rock-arm $k^7$ on said rock-shaft, as shown in Figs. 1 and 3. The rock-shaft of the blade $K^5$ has a depending arm $k^8$, which is connected by a rod $k^9$ with a similar arm $k^{10}$ on the rock-shaft of the blade $K'$, causing these blades to be raised and lowered together. A spring $l$, interposed between a stationary part of the main frame and a collar or shoulder on the rod $k^9$, causes the blades $K' K^5$ to be moved downwardly when the cam $k^6$ presents its receding portion to the rock-arm $k^7$. The arms of both folding-blades $K^2 K^4$ are secured to the same rock-shaft, the latter being operated by means of a cam L on the cam-shaft engaging a rock-arm $l'$ on said rock-shaft and turning the same in the direction for raising the blades $K^2$ $K^4$. The downward movement of these parts is produced by a spring $l^2$. The rock-shaft of the blade $K^6$ is moved in unison with the blades $K^2$ $K^4$ by means of a rod $l^3$, which connects rock-arms $l^4$ $l^5$, depending from said rock-shafts, as shown in Fig. 5. The rock-shaft of the fourth book-blade $K^3$ is operated from the cam-shaft by a transverse shaft $l^6$, journaled on the frame, an upwardly-projecting rock-arm $l^7$ having a roller engaging with the cam $k^6$ and a rod $l^8$ connecting a depending arm $l^9$ on the transverse shaft $l^6$ with a similar arm $l^{10}$ on the rock-shaft of the blade $K^3$, as shown in Figs. 1, 3, and 6.

When it is desired to produce a periodical-signature having one longitudinal fold and two successive parallel folds, the sheet is passed through the first rollers, the second rollers, and the third rollers parallel to the second. Upon passing the sheet successively through the first rollers, the second rollers, the third periodical-rollers parallel to the first, and the fourth periodical-rollers parallel to the third periodical-rollers the sheet will be folded accordingly suitable for periodicals. If it is desired to produce a book-signature having one transverse fold and two longitudinal folds, the sheet is passed successively through the first rollers, the second rollers, and the third book-rollers $d$ $d'$. Additional folds parallel to the first may be produced in the book-signature by passing the sheet as it issues from the second rollers through the third and fourth book-rollers $d$ $d'$, $e$ $e'$.

Figures 17, 18:
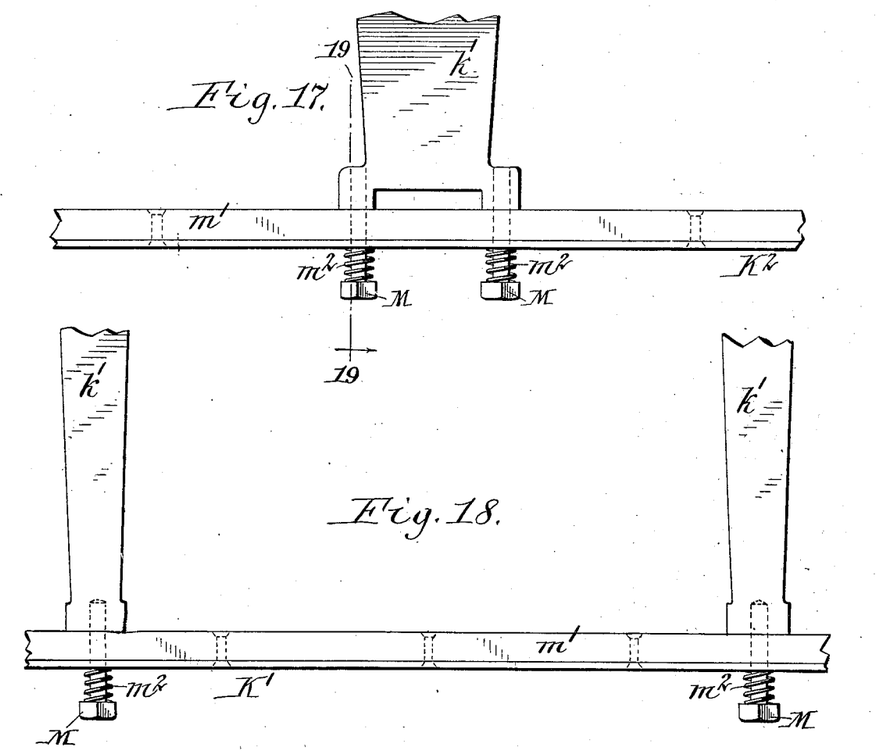
Fig. 17 is a fragmentary top plan view, on an enlarged scale, of one of the folding-blades having but a single carrier or supporting rock-arm.
Fig. 18 is a similar view showing a folding-blade having a pair of such carriers or supporting-arms.
Figures 19, 20:
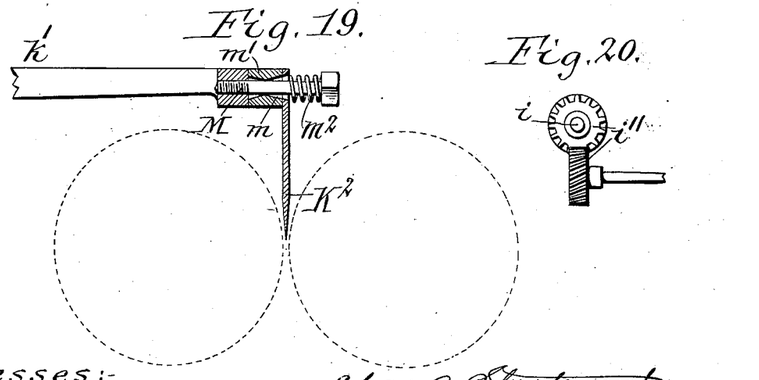
Fig. 19 is a vertical cross-section in line 19 19, Fig. 17.
Fig. 20 is a detached elevation of the gears forming part of the driving mechanism of the tapes which carry the signatures either to the book or periodical folding devices.

In folding-machines as heretofore constructed the blades have always been rigidly connected with their supporting-arms or other devices which actuated or carried the same. This construction is objectionable inasmuch as it necessitates accurate adjustment of the folding-blade relatively to the rollers with which the same coöperates, which involves expense, and it also necessitates separating the folding-rollers an abnormal extent in order to adapt them for folding different thicknesses of paper, rendering it impossible to produce a sharp fold in all kinds and thicknesses of paper. In the present construction it is proposed to mount the folding-blade on or connect the same yieldingly with its carrier or actuator in such manner that the blade may be deflected or moved laterally more or less by the folding-rollers and sheets upon passing between the same if the blade is not accurately centered. The preferred means for thus permitting the blade to adjust itself relatively to the folding-rollers consists of one or more bolts M, secured to the blade-support and passing through an opening $m$ in the blade and the stiffening-bar $m'$, at the upper edge thereof, and a spring $m^2$, interposed between the front side of the blade and the head of the bolt and operating to hold the back side of the stiffening-bar squarely in engagement with the face of the carrier. The opening in the blade and its stiffening-bar is flared from its center toward opposite ends, so as to permit the blade and bar to rock transversely relatively to its support and the rollers with which it coöperates. In practice two such bolts and springs are employed when the support of the blade consists of but a single rock-arm which is connected by these bolts with the center of the blade. Such a construction is employed for the short or small blades of the third periodical folding-blade $K^4$, the third book folding-blade $K^2$, and the fourth book folding-blade $K^3$, as shown in Figs. 3, 6, and 17. When the blade is comparatively long or large, the same is supported near opposite ends by two separate rock-arms, and each of these arms is connected with the blade by a single bolt and spring, as shown in Fig. 18. Such a construction is employed for supporting the blades $K'$ $K^5$, and $K^6$ of the second rollers, the third rollers parallel to the second and the fourth rollers parallel to the third periodical folding-rollers. The rollers of each pair which coöperate with a yielding blade are sufficiently close together to produce a comparatively sharp and perfect bend in the thinnest sheet which is designed to be folded in the machine, and the blade coöperating therewith is so adjusted relatively thereto that it passes centrally between the rollers. If any inaccuracy occurs in this adjustment, the blade upon entering between the rollers will simply be deflected laterally toward the center upon engaging with either one or the other of the rollers without producing any cramping of the mechanism or injury to the paper. When thicker paper is to be folded in the machine, this can be done without further adjusting the parts, inasmuch as the movable roller of each pair will yield the required extent to accommodate itself to the increased thicknesses of the sheets and the blade will be automatically deflected so as to enter between the rollers and engage the sheet centrally. This flexible or loose connection between the blade and its support is not absolutely necessary for the first folding-blade K, inasmuch as only one ply of paper is being acted upon at this time, and the difference in the thickness of one-ply does not materially affect the centering of the blade and rollers. This blade, as shown in the drawings, is therefore rigidly connected with its supporting-arms. The advantage derived by yieldingly connecting the blade with its support is, however, fully obtained upon producing the second fold in the sheet, and this advantage increases in proportion to the total number of folds which are produced in the sheet, inasmuch as the aggregate thickness of the signature increases at the same ratio, causing the separation of the folding-rollers and the shifting of the center between the same to become more pronounced as the sheets of paper increase in thickness.

When folding a book-signature, the tapes over the two third pairs of rollers $d\ d'$, $f\ f'$ are moved in the direction of the arrow, Fig. 3, whereby the sheet upon issuing from the second rollers will be carried over the third book-rollers. If, however, the sheet is to be folded into the form of a periodical-signature, the direction of movement of the tapes is reversed, so as to carry the sheet issuing from the second rollers either to the third periodical-rollers, which are parallel to the first, or to the fourth periodical-rollers, which are parallel to the second. This reversal of the movement of these tapes is effected by providing two sets of spiral gears $i^{11}$, whereby the roller $h$ may be connected with the main shaft I for driving these tapes in either direction. When the sheet is carried from the second rollers over the third book-rollers, the forward movement of the same in that direction is arrested by a gage $d^3$. A similar gage $f^3$ (shown in dotted lines in Fig. 3) is provided when the sheet is to be carried from the second rollers to the third periodical-rollers, which are parallel to the first. If, however, the sheet is to be carried directly from the second rollers to the fourth periodical-rollers $h\ h'$, then the gage $f^3$ is removed, permitting the sheet to move forward to the gage $h^2$ in position to be folded by the blade $K^5$ and rollers $h\ h'$.

For the purpose of enabling the machine to be quickly and reliably set so as to direct the sheet from the second rollers either toward the book-rollers or the periodical-rollers which are arranged on opposite sides thereof a switch mechanism is provided, which is constructed as follows: N N' represent a plurality of switch or deflector rollers which are arranged in a longitudinal series between the lower opposing parts of the coöperating second rollers. These deflector-rollers are mounted upon a rocking support, so as to permit the same to be swung into engagement with the lower side of either of the second rollers $c\ c'$. This rocking support preferably consists of a plurality of upright rock-arms $n$, a horizontal pivot or rod $n'$, mounted on the upper ends of these arms and carrying the deflector or switch rollers, and a rock-shaft $n^2$, to which the lower ends of the rock-arms are secured. This rock-shaft is journaled in a bracket $n^3$, which is secured to the adjacent stationary part of the main frame. Upon rocking the shaft in the direction for engaging the deflector-rollers N N' with the folding-roller $c$, as shown in Figs. 3, 11, and 13, the sheet issuing from the under sides of the second rollers will be directed by the deflecting-rollers underneath the roller $c$ of said pair, causing the same to be carried to the third book-rollers by the tapes D, which are moving in that direction. Upon turning the rock-shaft $n^2$ so as to carry the deflector-rollers against the folding-roller $c'$ the sheet passing downwardly between the two rollers $c\ c'$ will be directed around the under side of the roller $c'$ toward the periodical folding-rollers, in which direction the same will be carried by employing the proper gears $i^{11}$ for causing the tapes D to move in that direction. The deflector-rollers N N' may be shifted into engagement with one or the other of the folding-rollers $c\ c'$ and held in this position by any suitable means, preferably by means of a depending adjusting-arm O, secured at its upper end to the front part of the rock-shaft $n^2$ and provided at its lower end with a setting-point having inclined sides. This point preferably consists of a set-screw $o'$, having a tapering end which is adapted to engage with one or the other of two tapering sockets or recesses $o^2\ o^3$ in the adjacent part of the bracket $n^3$. These recesses are arranged close together, and the set-screw can be engaged with one or the other recess by springing the adjusting-arm outwardly, the same being sufficiently elastic to permit of this, thus avoiding the necessity of turning the adjusting-screw back and forth for this purpose. The relation of the set-screw to the recesses is such that upon shifting the adjusting-arm from one position to another the screw will not be exactly in line with either of these recesses, but will engage its conical point with the inclined margin of one of the conical recesses, so that the resilience of the adjusting-arm will cause the adjusting-screw to constantly tend to center itself in the respective recess, and thereby produce a yielding pressure of the deflector-rollers N N' against whichever second folding-roller they are bearing.

The central deflector-roller N has its periphery preferably faced with rubber, while the rollers N' on opposite sides of the same may have their peripheries either smooth or knurled. By this means a firm grip is obtained by the deflector-roller N upon the center of the sheet for positively controlling its movement while the other rollers N' hold the sheet sufficiently close to the respective second folding-roller for causing the sheet to pass around the under side of the latter. In the upper part of the bracket $n^3$ a fixed bearing P and a laterally-movable bearing P' are mounted, in which the shafts of the fixed and laterally-movable rollers of the third pair of book and periodical rollers $d\ d'$, $f f'$ are journaled, a spring $p$ serving to press the laterally-movable bearing constantly toward the fixed bearing, as shown in Fig. 9.

For the purpose of producing a row of perforations in the sheet as the same issues from the under side of the second folding-rollers a perforating device is provided, which is preferably constructed as follows: Q represents a rotary perforating wheel or disk having an annular row of perforating teeth or cutters on its periphery. This wheel is mounted on the upper end of a carrier or holder $q$, which may be secured to either side of the bracket $n^3$, so that the teeth of the perforating-wheel project into the path of the sheet as the same moves from the folding-rollers $c$ $c'$ either toward the book-rollers or the periodical-rollers on opposite sides of the same. Each of the second folding-rollers is provided centrally with an annular groove $q'$, into the lower part of which the teeth on the upper side of the perforating-wheel are adapted to project a sufficient extent to cross the path of the sheet and insure perforating of the same. As shown in full lines in Fig. 11, the perforator is applied to the right-hand roller $c$ of the second folding device, whereby the sheet is perforated while in transit from the second folding device to the third book-rollers. Upon reversing the perforator into the position shown by dotted lines in the same figure this perforator coöperates with the left-hand roller $c'$ of the second folding device for perforating the sheet while in transit from the second rollers to the periodical-rollers. The holder or carrier which supports the perforator is preferably secured against one side or the other of the bracket $n^3$ by means of a bolt $q^2$ passing through the holder and a vertical slot $q^3$ in the bracket, which slot permits of adjusting the rotary perforator relatively to the respective folding-roller for adapting the same to different thicknesses of paper and also for taking up wear.

For the purpose of causing the sheet upon issuing from the under side of the third book-rollers to be discharged either into a stacker-box below the same or to the fourth book folding-rollers $e$ $e'$ for producing another fold in the same, the rollers $e^2$, which carry the receiving ends of the back tapes E, are adjustably supported, so as to be bodily movable into and out of the path of the sheets as they issue from the third book folding-rollers $d$ $d'$. In addition to the tape-rollers $e^2$, a plurality of auxiliary deflector or switch rollers $r$ are employed, one of which is arranged centrally between the tape-rollers $e^2$ and two others on opposite sides of the same, whereby a more extended support for the sheet is produced upon deflecting the same from the third book-rollers to the fourth book-rollers. When it is desired to discharge the completed signature directly downward from the third book-rollers, the tape-rollers $e^2$ and their companion deflector-rollers $r$ are withdrawn inwardly or out of the path of the signature as the same issues from the under side of the third book-rollers, as represented in Fig. 4. When it is desired to direct the sheets from the third book-rollers to the fourth book-rollers, the tape-rollers $e^2$ and the deflector-rollers $r$ are moved outwardly and upwardly into the space between the lower parts of the third book-rollers, as shown in Fig. 14, thereby causing the same to intercept the sheet issuing from these rollers and direct the same to the fourth book-rollers. It will be observed that these tape-rollers $e^2$ not only serve to support the tapes, but also serve as deflector-rollers which, together with the deflector-rollers $r$, control the movement of the sheet. The preferred means for effecting the bodily adjustment of the tape and deflector rollers $e^2$ $r$ into and out of their operative position is constructed as follows and is best shown in Figs. 3, 4, 5, 11, 13 to 16: R represents a horizontal shaft or rod upon which the rollers $e^2$ $r$ are mounted. $r'$ represents two rock-arms, upon the upper free ends of which the shaft R is journaled near its opposite ends. The lower ends of these rock-arms are pivoted on the upper end of two vertically-movable slides R', which move in guideways $r^2$, arranged on the adjacent part of the main frame. Upon elevating the slides the rollers $e^2$ $r$ and the tapes E, mounted on some of them, engage with the under side of the inner folding-roller $d$ and are forced thereby into the space between the third book folding-rollers $d$ $d'$, as shown in Fig. 14, in which the sheet is intercepted and directed to the fourth book-rollers. Upon lowering the slides the rollers $e^2$ $r$ are moved inwardly out of the path of the sheets issuing from the third book-rollers by means of two shifting-fingers $s$ $s$, each of which is secured at its lower end to the adjacent part of the main frame, while its upper end engages with the front side of one of the rock-arms $r'$. These fingers are preferably constructed of spring metal, so that they will adapt themselves to the varying positions of the rock-arms $r'$. In order to insure a firm engagement of the tapes and rollers $e^2$ $r$ with the rear or inner third book-roller $d$, a yielding upward pressure is applied to each of the rock-arms $r'$ by means of a spring $s'$, secured to the upper end of each slide R' and engaging with the under side of a pin or shoulder $s^2$ on the adjacent rock-arm $r'$, as shown in Figs. 13 and 15. In the projected or operative position of the rollers $e^2$ $r$ the tapes are sufficiently taut to properly carry the sheets from the third book-rollers to the fourth book-rollers; but in the retracted or inoperative position of the rollers $e^2$ $r$ these tapes become slack, which, however, is not objectionable, as the tapes are not in use at this time. If desired, the tapes may be driven solely by frictional contact with the folding-roller $d$; but it is preferable to drive them positively in order to more reliably deliver the sheets from the third to the fourth book-rollers. This positive driving of the tapes E, as shown in Figs. 11, 13, 15, and 16 of the drawings, is effected by arranging a gear-pinion $r^3$ on one end of the deflector-shaft R and engaging the same with a gear-wheel $r^4$ on the adjacent end of the folding-roller $d$. In order to increase the carrying effect of the rollers $r$, the same are preferably faced on their periphery with rubber. Although various means may be employed for raising and lowering the slides R', that shown in the drawings is preferred, owing to its simplicity and convenience of manipulation, and is constructed as follows: T represents a horizontal rock-shaft arranged in rear of the slides R' and journaled in bearings mounted on the adjacent part of the main frame. This rock-shaft is connected with each of the slides R' by a pair of upright toggle-bars $t\ t'$, as shown in Figs. 13 and 14. Upon turning the toggle rock-shaft by means of a handle $t^2$ in the direction for straightening the toggles, as represented in Figs. 13 and 14, the slides are raised and the rollers $e^2\ r$ and tapes E are moved into their operative position, while upon turning the rock-shaft T in the opposite direction for breaking the toggle-bars, as shown in Fig. 4, the slides are lowered and the rollers $e^2\ r$ and tapes E are moved into their retracted or inoperative position. This means of throwing the sheet from the third book-rollers either into a box below the same or toward the fourth book-rollers is very simple in construction and reliable in operation and permits this change to be effected quickly and without disturbing any other parts of the machine.

In order to elevate the lower part of the tapes E above the bearings or supports in which the front ends of the fourth book-rollers are journaled, these tapes are passed over a guide-roller $t^3$, which is preferably mounted on a rod $t^4$, which serves also to pivotally connect the rock-arms $r'$ with the upper parts of the slides R', as shown in Figs. 11, 13, and 14.

Any suitable stacking mechanism may be provided, that shown in the drawings being constructed as follows: U U' $U^2$ $U^3$ represent the receiving or packing boxes, which are arranged, respectively, below the rollers $d\ d'$, $e\ e'$, $h\ h'$, and $g\ g'$. $u\ u'\ u^2\ u^3$ represent the packers, which push the signatures forwardly in the boxes. V represents an upright packer or rock-shaft from which all of the packers of the several stacking devices are simultaneously operated and which is actuated by a cam $v$ on the cam-shaft. The boxes U $U^2$ $U^3$ are not adjustable vertically; but the box U' is made vertically adjustable by means of a shank X, which supports the stacking-box U' and carries a gear-rack $x'$, which meshes with an adjusting gear-pinion $x^2$.

Preparatory to entering the folding-machine the sheets are registered at their front edges by front guides or gages Y, and after being fed over the first pair of folding-rollers the sheet is also registered on one of its side edges by a side register or gage Z.

I claim as my invention—

1. A folding-machine comprising folding-rollers, a folding-blade movable toward and from said rollers, a carrier for said blade, and an automatic adjusting device connecting said blade with said carrier and constructed to constantly hold said blade yieldingly on the carrier, substantially as set forth.

2. A folding-machine comprising folding-rollers, a folding-blade movable toward and from said rollers, a carrier for said blade, means constructed to loosely connect said blade and carrier, and a spring operating to hold said blade yieldingly in position, substantially as set forth.

3. A folding-machine comprising folding-rollers, a folding-blade movable toward and from said rollers, a carrier for said blade, a bolt arranged on said carrier and passing loosely through said blade, and a spring mounted on said bolt and operating to hold said blade yieldingly in position, substantially as set forth.

4. A folding-machine comprising folding-rollers, a folding-blade, an actuator for moving the blade toward and from the rollers, and means for flexibly connecting said blade with said actuator consisting of a bolt secured to the actuator and passing loosely through an opening in the blade, and a spring interposed between a shoulder on the bolt and the front of the blade, substantially as set forth.

5. A folding-machine comprising folding-rollers, a folding-blade having an opening in its rear edge, a rock-arm, a bolt secured to the arm and passing loosely through said opening, and a spring mounted on said bolt and interposed between the front of the blade and a head on the bolt, substantially as set forth.

6. A folding-machine comprising folding-rollers, a folding-blade having a stiffening-bar along the back of its rear edge, said blade and bar having an opening through the same which flares from its central part toward opposite ends, a rock-arm with which the back of said bar engages, a bolt secured to said arm and passing loosely through said opening, and a spring surrounding said bolt and bearing with its ends against the front of the blade and the head of the bolt, substantially as set forth.

7. A folding-machine comprising a pair of folding-rollers, two pairs of folding-rollers arranged on opposite sides of the first-mentioned pair, and a single set of carrying-tapes arranged between said first-mentioned pair of rollers and both of said last-mentioned pairs of rollers, substantially as set forth.

8. A folding-machine comprising a pair of folding-rollers, two pairs of folding-rollers arranged on opposite sides of the first-mentioned pair, a single set of carrying-tapes arranged between said first-mentioned pair of rollers and both of said last-mentioned pairs of rollers, and a switch for directing the sheets from said first-mentioned pair of rollers to either of said last-mentioned pairs of rollers, substantially as set forth.

9. A folding-machine comprising a pair of folding-rollers, two pairs of folding-rollers arranged on opposite sides of the first-mentioned pair, a single set of carrying-tapes arranged between said first-mentioned pair of rollers and both of said last-mentioned pairs of rollers, driving mechanism for moving said tapes in either direction, and a switch for directing the sheets from said first-mentioned pair of rollers to either of said last-mentioned pairs of rollers, substantially as set forth.

10. A folding-machine comprising a pair of folding-rollers and a switch for directing the sheets from the folding-rollers toward either side thereof comprising deflector-rollers arranged between the folding-rollers, and means for shifting said deflector-rollers toward either of said folding-rollers, said deflecting-rollers being constructed and operating to cause the sheet to travel between the deflecting-roller and the respective folding-roller against which the deflecting-rollers are thrown, substantially as set forth.

11. A folding-machine comprising a pair of folding-rollers and a switch for directing the sheets from the folding-rollers toward either side thereof comprising deflector-rollers arranged between the folding-rollers, and rock-arms upon which said deflector-rollers are mounted, said deflecting-rollers being constructed and operating to cause the sheet to travel between the deflecting-roller and the respective folding-roller against which the deflecting-rollers are thrown, substantially as set forth.

12. A folding-machine comprising a pair of folding-rollers and a switch for directing the sheets from the folding-rollers toward either side thereof comprising deflector-rollers arranged between the folding-rollers, rock-arms carrying said deflector-rollers, and an adjusting-arm connected with said rock-arms, said deflecting-rollers being constructed and operating to cause the sheet to travel between the deflecting-roller and the respective folding-roller against which the deflecting-rollers are thrown, substantially as set forth.

13. A folding-machine comprising a pair of folding-rollers and a switch for directing the sheets from the folding-rollers toward either side thereof comprising deflector-rollers arranged between the folding-rollers, rock-arms carrying said deflector-rollers, a bracket provided with recesses having inclined sides, and an adjusting-arm connected with the rock-arms and having an inclined point adapted to engage with either of said recesses, substantially as set forth.

14. A folding-machine comprising a pair of folding-rollers and a switch for directing the sheets from the folding-rollers toward either side thereof comprising deflector-rollers arranged between the folding-rollers, rock-arms upon which said deflector-rollers are mounted, a rock-shaft to which said rock-arms are secured, a bracket having bearings in which said shaft is journaled and provided with a plurality of conical recesses, an adjusting-arm connected with said shaft, and a set-screw arranged on said adjusting-arm and having a conical end which is adapted to enter either of said conical recesses, substantially as set forth.

15. A folding-machine comprising a pair of folding-rollers, a set of deflector-rollers arranged between said folding-rollers and having its central member provided with an elastic face while the remaining members have non-elastic faces, and means for moving said deflector-rollers toward either of said folding-rollers, substantially as set forth.

16. A folding-machine comprising one pair of folding-rollers, two other pairs of folding-rollers arranged on opposite sides of the first-mentioned pair of rollers, deflector-rollers arranged between the rollers of the first-mentioned pair, and means for moving said deflector-rollers toward either roller of the first-mentioned pair for directing the sheets from the same to either pair of folding-rollers on opposite sides of the same, substantially as set forth.

17. A folding-machine comprising one pair of folding-rollers, two other pairs of folding-rollers arranged on opposite sides of the first-mentioned pair of rollers, a single set of carrying-tapes arranged on the delivery side of the first-mentioned pair of folding-rollers and extending to both pairs of folding-rollers on opposite sides of the same, deflector-rollers arranged between the rollers of the first-mentioned pair, and means for moving said deflector-rollers toward either roller of the first-mentioned pair for directing the sheets from the same to either pair of folding-rollers on opposite sides of the same, substantially as set forth.

18. A folding-machine comprising a pair of folding-rollers, two other pairs of folding-rollers arranged on opposite sides of the first-mentioned pair of rollers, a bracket arranged below the first-mentioned pair of rollers, bearings which are mounted on said bracket and in which said last-mentioned pairs of rollers are journaled, deflector-rollers arranged between the rollers of the first-mentioned pair, and means mounted on said bracket for moving said deflector-rollers toward either roller of the first-mentioned pair, said deflecting-rollers being constructed and operating to cause the sheet to travel between the deflecting-roller and the respective folding-roller against which the deflecting-rollers are thrown, substantially as set forth.

19. A folding-machine comprising a pair of folding-rollers each having an annular groove, means for directing the sheet toward either side of said rollers upon issuing from the same, a rotary perforator having an annular row of teeth, and means for holding said perforator with its teeth projecting into the groove of either of said rollers, substantially as set forth.

20. A folding-machine comprising a pair of folding-rollers each having an annular groove, means for directing the sheet toward either side of said rollers upon issuing from the same, a bracket arranged below said rollers, a rotary perforator having an annular row of teeth, and a holder for said perforator constructed for attachment to either side of said bracket and adapted to support the perforator in position for projecting its teeth into the groove of either of said rollers, substantially as set forth.

21. A folding-machine comprising a pair of folding-rollers, two other pairs of folding-rollers arranged on opposite sides of the first-mentioned pair of rollers, means for directing the sheet from said first-mentioned pair of rollers to either of said last-mentioned pairs of rollers, and a perforating-wheel adapted to be arranged between either roller of the first-mentioned pair and one of the last-mentioned pairs of rollers, substantially as set forth.

22. A folding-machine comprising a pair of folding-rollers, two other pairs of folding-rollers arranged on opposite sides of the first-mentioned pair of rollers, a single set of tapes arranged below the first-mentioned pair of rollers and extending in opposite directions to both of the last-mentioned pairs of rollers, means for directing the sheet from said first-mentioned pair of rollers to either of said last-mentioned pairs of rollers, and a perforating-wheel adapted to be arranged between either roller of the first-mentioned pair and one of the last-mentioned pairs of rollers, substantially as set forth.

23. A folding-machine comprising a pair of folding-rollers, deflector-rollers, and means for moving the deflector-rollers into and out of the path of the sheets issuing from the folding-rollers and into and out of operative engagement with one of said folding-rollers, said deflector-rollers being constructed and operating to cause the sheet to travel between the same and the folding-roller against which it is thrown, substantially as set forth.

24. A folding-machine comprising a pair of folding-rollers, deflecting-rollers, and means for moving the deflector-rollers into and out of the path of the sheets issuing from the folding-rollers and into and out of operative engagement with one of said folding-rollers comprising rock-arms supporting said deflector-rollers, said deflector-rollers being constructed and operating to cause the sheet to travel between the same and the folding-roller against which it is thrown, substantially as set forth.

25. A folding-machine comprising a pair of folding-rollers, deflector-rollers for controlling the direction of movement of the sheets upon issuing from said folding-rollers, and means for moving the deflector-rollers into and out of the path of the sheets comprising rock-arms which support the deflector-rollers and slides upon which said rock-arms are mounted, substantially as set forth.

26. A folding-machine comprising a pair of folding-rollers, deflector-rollers for controlling the direction of movement of the sheets upon issuing from said folding-rollers, and means for moving the deflector-rollers into and out of the path of the sheets comprising rock-arms which support said deflector-rollers, slides upon which the rock-arms are mounted, springs operating to hold said rollers yieldingly in engagement with one of the folding-rollers, and retracting-fingers engaging with said rock-arms and operating to move the deflector-rollers out of the path of the sheets, substantially as set forth.

27. A folding-machine comprising a pair of folding-rollers, deflector-rollers for controlling the direction of movement of the sheets upon issuing from said folding-rollers, and means for moving the deflector-rollers into and out of the path of the sheets comprising rock-arms which support said deflector-rollers, slides upon which the rock-arms are mounted, and a toggle device for moving said slides, substantially as set forth.

28. A folding-machine comprising a pair of folding-rollers, deflector-rollers for controlling the direction of movement of the sheets upon issuing from said folding-rollers, and means for moving the deflector-rollers into and out of the path of the sheets comprising rock-arms which support said deflector-rollers, slides upon which the rock-arms are mounted, a rock-shaft, and toggles connecting said shaft with said slides, substantially as set forth.

29. A folding-machine comprising a pair of folding-rollers, deflector-rollers for controlling the direction of movement of the sheets upon issuing from the folding-rollers, means for moving said deflector-rollers into and out of the path of the sheets, a shaft carrying said rollers, and a gear-pinion secured to said shaft and meshing with a gear-wheel which turns with one of said folding-rollers, substantially as set forth.

30. A folding-machine comprising a pair of folding-rollers, deflector-rollers for controlling the direction of movement of the sheets upon issuing from the folding-rollers, means for moving said deflector-rollers into and out of the path of the sheets, and carrying-tapes passing around said deflector-rollers, substantially as set forth.

31. A folding-machine comprising a pair of folding-rollers, another pair of folding-rollers arranged adjacent to the first-mentioned pair, deflector-rollers movable into and out of the path of the sheets issuing from the first-mentioned pair of folding-rollers, and carrying-tapes passing around said deflector-rollers to said last-mentioned pair of folding-rollers, substantially as set forth.

32. A folding-machine comprising a pair of folding-rollers, another pair of folding-rollers arranged adjacent to the first-mentioned pair, deflector-rollers movable into and out of the path of the sheets issuing from the first-mentioned pair of folding-rollers, carrying-tapes passing around said deflector-rollers to said last-mentioned pair of folding-rollers, slides upon which said deflector-rollers are mounted, and guide-rollers for said tapes mounted on said slides, substantially as set forth.

33. A folding-machine comprising a pair of folding-rollers, another pair of folding-rollers arranged adjacent to the first-mentioned pair, deflector-rollers movable into and out of the path of the sheets issuing from the first-mentioned pair of folding-rollers, carrying-tapes passing around said deflector-rollers to said last-mentioned pair of folding-rollers, rock-arms carrying said deflector-rollers, slides upon which said arms are pivoted, and a guide-roller for said tapes mounted on the pivot of said rock-arms, substantially as set forth.

34. A folding-machine comprising one pair of folding-rollers, another pair of folding-rollers arranged on one side of the first-mentioned pair, and a sheet-controlling device comprising deflector-rollers movable against one roller of the first-mentioned pair of rollers and into the path of the sheets issuing from the same for directing the sheets to the last-mentioned pair of rollers or to clear said path for directing the sheets away from said last-mentioned pair of rollers, said deflector-rollers being constructed and operating to cause the sheets to travel between the same and the roller of the first-mentioned pair when thrown against the same, substantially as set forth.

Witness my hand this 18th day of January, 1905.

CHARLES A. STURTEVANT.

Witnesses:
   GEO. W. PARDEE,
   ELLSWORTH E. BUSH.